(12) United States Patent
Bong

(10) Patent No.: US 7,550,692 B2
(45) Date of Patent: *Jun. 23, 2009

(54) CONSUMABLE GUIDE TUBE

(76) Inventor: William L. Bong, 1971 Broadway St., Vallejo, CA (US) 94589

( * ) Notice: Subject to any disclaimer, the term of this patent is extended or adjusted under 35 U.S.C. 154(b) by 0 days.

This patent is subject to a terminal disclaimer.

(21) Appl. No.: 11/591,190

(22) Filed: Oct. 30, 2006

(65) Prior Publication Data
US 2007/0125759 A1 Jun. 7, 2007

Related U.S. Application Data

(63) Continuation of application No. 09/757,738, filed on Jan. 9, 2001, now Pat. No. 7,148,443.

(60) Provisional application No. 60/188,782, filed on Mar. 13, 2000, provisional application No. 60/175,574, filed on Jan. 11, 2000.

(51) Int. Cl.
*B23K 25/00* (2006.01)
(52) U.S. Cl. .................................................. 219/73.1

(58) Field of Classification Search ................ 219/73.1, 219/73.11, 137.61
See application file for complete search history.

(56) References Cited

U.S. PATENT DOCUMENTS

| | | | | |
|---|---|---|---|---|
| 3,243,568 A | * | 3/1966 | Burden | 219/73.1 |
| 4,208,564 A | * | 6/1980 | Wada et al. | 219/73.1 |
| 7,148,443 B2 | * | 12/2006 | Bong | 219/73.1 |

* cited by examiner

*Primary Examiner*—Kevin P Kerns
(74) *Attorney, Agent, or Firm*—Charles L. Thoeming

(57) ABSTRACT

A consumable guide tube includes a thin first elongated strip, a second elongated strip and a plurality of insulators. The thin first elongated strip has a front face having at least one longitudinal channel and a back face. The second elongated strip has a front face configured to be coupled to the front face of the first elongated strip and a back face. The plurality of insulator modules are deposited on the back faces of the thin first elongated strip and the second elongated strip. Preferably, the thin first elongated strip is a low carbon cold-rolled steel strip, and the second elongated strip is a low carbon hot-rolled steel strip. The guide tube is also configured to include two or more longitudinal channels.

20 Claims, 9 Drawing Sheets

CONSUMABLE GUIDE TUBE

The present application is a Continuation of: 1) provisional patent application Ser. No. 60/175,574, filed on Jan. 11, 2000, titled a "System and Method for Employing a Guide Tube in an Electroslag Weld", 2) provisional patent application Ser. No. 60/188,782 filed on Mar. 13, 2000 and titled "Welding System", 3) and non-provisional patent application Ser. No. 09/757,738, filed Jan. 9, 2001, now U.S. Pat. No. 7,148,443, issued Dec. 12, 2006.

BACKGROUND OF THE INVENTION

1. Field of the Invention

The present invention relates to a consumable guide tube used in welding. More particularly, the guide tube of the present invention provides an economical and cost effective solution for guide tube manufacturing.

2. Background Art

Generally, the electroslag method generally involves bringing the ends of two substrates or workpieces together to create a gap between the ends of the plates. Welding shoes, which are generally made of copper, are then placed on each side of the gap to form a cavity between the plates and welding shoes. A steel guide tube is placed into the welding cavity for feeding a single welding wire into the cavity.

Current is then conducted through an electrode, comprising the guide tube and the welding wire, to the parent substrate material and an arc is struck in the bottom of the welding cavity. A granular flux is sprinkled into the welding cavity and melts under the influence of the arc to form a molten slag. As wire continues to feed into the cavity, the level of the molten slag rises to come in contact with the bottom of the guide tube and the welding arc is extinguished. The electric current passing between the electrode and the substrates is conducted though the molten slag. Heat generated by the molten slag melts the electrode, welding wire, and substrates to generate a molten metal puddle. Since the molten metal is heavier than the molten slag, the metal gravitates to the bottom and the slag floats on top. During the welding process current and voltage are transmitted to the molten slag and metal weld puddle. A relatively deep weld metal puddle is generated, which includes a relatively high percentage of parent material. As the weld progresses vertically, the bottom of the metal puddle cools and fuses the substrates to form an electroslag weld.

Welding wire is continually fed into the molten slag, and the weld continues to progress vertically until the welding cavity is filled with molten metal. As the weld rises, the molten slag pool continues to melt-off of the bottom of the guide tube. The guide tube is consumable and contributes to the weld metal. The copper shoes retain the molten slag and weld metal, and are removed when the weld is completed. A comprehensive description of electroslag welding is provided in the American Welding Society *Welding Handbook*, eighth edition, which is incorporated by reference.

A recent improvement to the traditional electroslag method has been developed by the Oregon Graduate Institute (OGI) and is known as the Narrow Gap Improvement electroslag welding method (NGI-ESW). OGI's NGI-ESW process advocates employing a narrow gap of approximately 0.75 of an inch between the substrates. Traditionally, a 1¼ inch gap between the substrates was used. Much like the previously described electroslag process, OGI advocates using a traditional guide tube design which feeds only a single wire and which does not oscillate.

Referring to FIG. 1a, a traditional winged guide tube 10 having a standard piece of heavy-wall metal tubing with wings 12. The wings 12 are separately welded to the heavy-wall metal tubing 13. The internal diameter of the metal tubing 13 is approximately ⅛ of an inch and the outer diameter is approximately ⅜ of an inch. The wings 12 are tack-welded 14 to the edges of the metal tubing as shown in FIG. 1a.

Referring to FIG. 1b, there is shown a cross-sectional view of the winged guide tube 10 of FIG. 1a. For illustrative purposes the tack welds 14 for the winced guide tube 10 are shown.

The wings 10 are used to spread the current across the molten slag. During the welding process, the weld puddle generated by OGI NGI-ESW electroslag method is deep and wide. This deep and wide weld puddle has a high percentage of substrate metal in the weld metal. Therefore, the limitation of OGI's NGI-ESW method is that it fails to maintain a shallow weld puddle at higher welding currents. If a single welding wile is used, the puddle becomes deeper with the increase in weld speed. If the puddle becomes too deep, the grain formation creates by the solidifying weld metal can make the resulting weld more crack sensitive.

Referring to FIG. 1c, there is shown a cross sectional view of a webbed guide tube which has a plate 20 welded between a first metal tubing 22 and second metal tubing 23.

Referring to FIG. 1d there is shown a combination winged and webbed guide tube 25 having wrings 26 and 27 welded to metal tubing 28a and 28b, respectively. Additionally webs 29a and 29b are welded to tubing 30 and metal tubing 28a and 28b.

Referring to FIG. 1e, there is shown another guide tube described in Canadian Patent 886,174 issued to Norcross and titled Electroslag Welding Nozzle and Process. The Norcross '174 patent describes an upwardly extending stationary consumable metallic nozzle having a metallic guide tube through which a single welding wire is introduced. The consumable metallic nozzle has wing bars extending out oil two sides of the guide tube and an adhering coating of flux covering the nozzle, which melts off as the weld rises, and as the nozzle itself melts off. In an electroslag process using a narrow welding gap, i.e. NGI-ESW, the thin layer of flux used by Norcross would generate an arc between the guide tube electrode and the substrate or welding shoes. Furthermore, it the thick plates used by Norcross would draw too much amperage.

The drawback of the current design of guide tubes is that they must be custom designed for a particular application. This customization makes the guide tubes expensive to manufacture. More specifically, tubing must be purchased, and the plates must be sheared or the plates must be individually purchased. Then the plates must be welded to the tubing to meet relatively high tolerances. These guide tubes are very time consuming and expensive to manufacture.

Another drawback of the present guide tube designs is that they restrict themselves to using guide tubes which are "wedged" in place and do not oscillate. Even though multiple wile guide tube designs are taught, these guide tubes are made from tubing with wings and webs to join them together. In each case the guide tubes are "wedged" in tightly and are not configured to oscillate. Therefore, there is a need for a guide tube design which facilitates oscillation.

A final drawback to present welding methods employing a consumable guide tube is that they fail to maintain a shallow weld puddle at higher welding currents, and become crack sensitive at higher weld speeds (vertical rate of rise). When using a fixed guide tube, welding voltage must be increased to increase the diameter of the weld. To make sure that the weld penetrates all four corners of the weld cavity, the voltage must be substantially increased. This causes wider weld puddles, more substrate dilution, and larger heat affected zone (HAZ) in the substrate. This large HAZ lowers the physical characteristics of the substrate. Oscillation is used to spreads the weld puddle, instead of voltage. This results in a much smaller weld puddle, and HAZ, and better physical characteristics of the substrate with the oscillating multiwire guide tube.

Therefore, it would be beneficial to provide a standard off-the-shelf guide tube that can be used to perform a variety of welds.

It would also be beneficial to provide a consumable guide tube that is simple and economical to manufacture.

Additionally, it would be beneficial to provide a consumable guide tube which can feed at least two welding wires.

Furthermore it would be beneficial to provide a guide tube that operates in electroslag process that uses oscillation.

Further still it would be beneficial to provide a guide tube with insulator modules which prevent arcing with the substrates and the welding shoes.

Further still, it would be beneficial to provide a guide tube with insulator modules which do not increase the depth of the molten slag.

Finally, it would be beneficial to provide a consumable guide tube that can sustain a shallow weld puddle so that the resulting weld is less crack prone and impact values for the weld are increased.

SUMMARY OF THE INVENTION

The present invention is a guide tube which guides at least one welding wires into a welding cavity, transmits welding amperage, voltage and current to said welding wire, and is consumed during the welding process. Preferably, the welding process is the electroslag welding process. The guide tube comprises a first elongated metal strip having a front face and a back face and a second elongated metal strip having a front face and a back face. At least one longitudinal channel is defined on the front face of the first elongated metal strip. The front face of the first elongated metal strip is joined to the front face of the second elongated metal strip. The at least one channel is positioned to receive at least one welding wire. Preferably, the first elongated metal strip is a thinner metal strip than the second elongated metal strip. Alternatively, the first elongated strip is the same thickness as the second elongated strip.

A plurality of insulator modules are attached to the back face of the first elongated metal strip and the back face of the second elongated metal strip at incremental stages. Preferably, the plurality of insulator modules are positioned to prevent arcing between the guide tube electrode and the substrate material and the copper shoes. Preferably, the insulator modules do not increase the depth of the molten slag puddle because the molten slag contribution from the insulator modules matches or is less than the molten slag which is lost from deposition on the welding shoes.

Additionally, the guide tube provides for the production of an electroslag weld which has a reduced based substrate material in the electroslag weld and a smaller heat affected zone. More specifically the present invention uses the guide tube described above to weld metal substrates by positioning two substrates to define a substantially narrower gap, and then positioning a pair of welding shoes adjacent the gap to define a welding cavity. The guide tube is then positioned within the weld cavity to feed at least one welding wire. Sufficient amperage and voltage is provided to the guide tube and welding wire to be capable of striking an arc against the substrates. The welding cavity is then filled with flux, which melts and generates a molten slag that extinguishes the arc. The molten slag melts the guide tube and the welding wire and generates a molten weld metal pool. The guide tube is then oscillated. The combined oscillation and the preferable feeding of at least two wires generates a shallow molten metal pool depth. The electrical operating parameters and wire feed rate are controlled to maintain a shallow weld puddle. The resulting weld between the substrates is an impact resistant weld.

BRIEF DESCRIPTION OF THE DRAWING

FIG. 1b is a cross-sectional view of the winged guide tube of FIG. 1a.

FIG. 2b is a cross-section of FIG. 2a.

FIG. 6b is a cross-sectional view of FIG. 2a.

DETAILED DESCRIPTION OF THE INVENTION

Figure 1A:
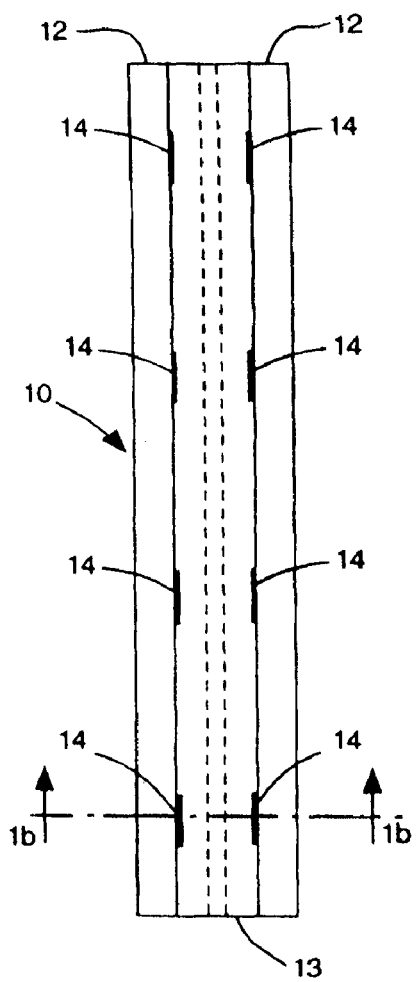
FIG. 1a is a prior art winged guide tube.
Figure 1B:
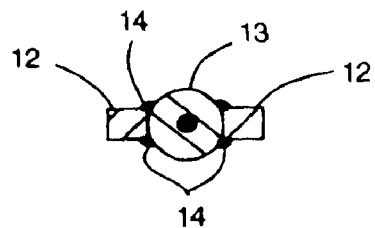
Figure 1C:
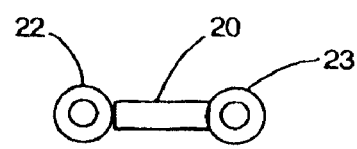
FIG. 1c is cross-sectional view of a prior art webbed guide tube.
Figure 1D:
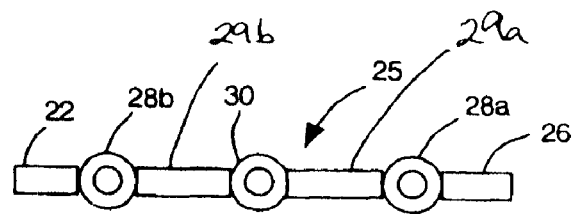
FIG. 1d is a cross-sectional view of a combination winged and webbed guide tube.
Figure 1E:
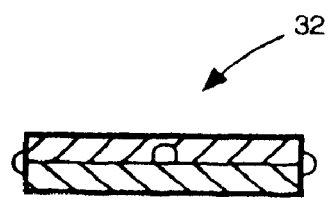
FIG. 1e is another prior art guide tube.

Persons of ordinary skill in the art will appreciate that the following description of the present invention is illustrative only and not in any way limiting. Other embodiments of the invention will readily suggest themselves to such skilled persons in the art having the benefit of this disclosure.

The present guide tube design provides a solution which minimizes the cost of a consumable guide tube for welding and maximizes the quality of the surrounding weld. The application of the consumable guide tube disclosed herein is based upon Electroslag welding methods. In particular, the guide tube described herein is employed in an oscillating Electroslag welding process which is described in patent application Ser. No. 09/058,741, U.S. Pat. No. 6,297,472, titled "Welding System and Method" which is hereby incorporated by reference. However, it shall be appreciated by those skilled in the art having the benefit of this disclosure that the principles of guide tube design described in this patent may also be applied to other welding methods.

Electroslag welding uses a large power supply to generate a molten flux which drives the electroslag process. In an environment having a constant voltage power supply, the constant voltage power supply draws current according to the load placed on the power supply. In the case of electroslag welding, the inventor found that the load is determined by the cross-sectional area of the guide tube which is exposed to the molten flux puddle. The inventors have found that the cross-sectional area of the guide tube affects the load on the welding power supply. The larger the cross-sectional area that is immersed in the molten flux puddle the higher the current draw (when using a constant voltage power supply). If the cross-sectional area immersed in the molten flux puddle becomes too great, the minimum current produced by the constant voltage power supply will become too high to produce an acceptable weld. If oscillation cannot be used, the guide tube width and thickness has to be specifically designed to match the thickness of the strips to be welded.

During experimental efforts undertaken by the inventor, a guide tube having two 4-inch wide metal strips which were each ¼-inch thick was subjected to the electrical loading for Electroslag welding. The cross-sectional area of the guide tube was 2 square inches. The load was so great on the was 2 square inch guide tube that when the guide tube made contact with the slag puddle the amperage of the power supply could not be reduced below 2500-Amps. To solve this problem the plates were made thinner. For a 4-inch wide weld, the preferred guide tube design included a current carrying plate being ⅛ inch thick fixedly coupled to a wire guide plate having a 22-gauge material. It shall be appreciated that the 22-gauge plate equivalent is a 0.025 inch plate. The cross-sectional area of the preferred guide tube for a 4-inch weld was 0.6 square inches.

By way of example and not of limitation, if a weld which was 8-inch wide is undertaken, then the guide tube dimensions for a 4-inch weld draws too high a load because the cross-sectional area would be too high, e.g. 1.2 inches^2. To adequately bring down the amperage, the cross-sectional area for a guide tube making an 8-inch weld would be reduced to having a current carrying strip of 1/16" thick, and a wire guide strip being made of a 22-guage material. Therefore, the cross-sectional area of the preferred guide tube for an 8-in weld was 0.7 inches^2.

Figure 2B:
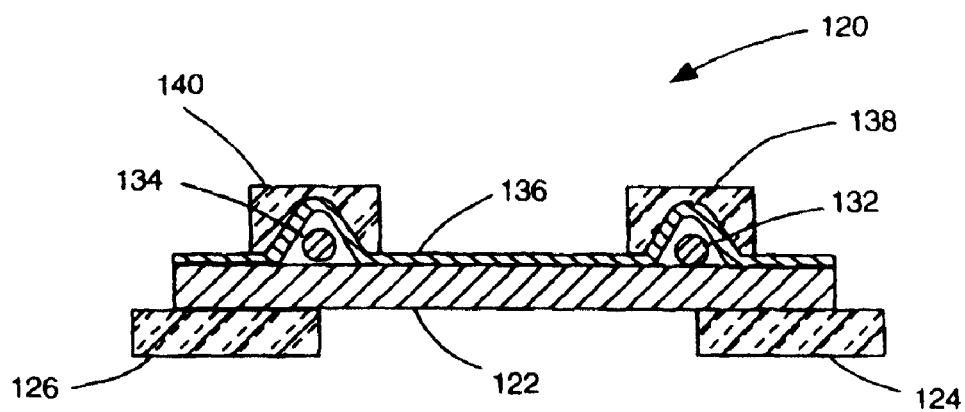
Figure 2A:
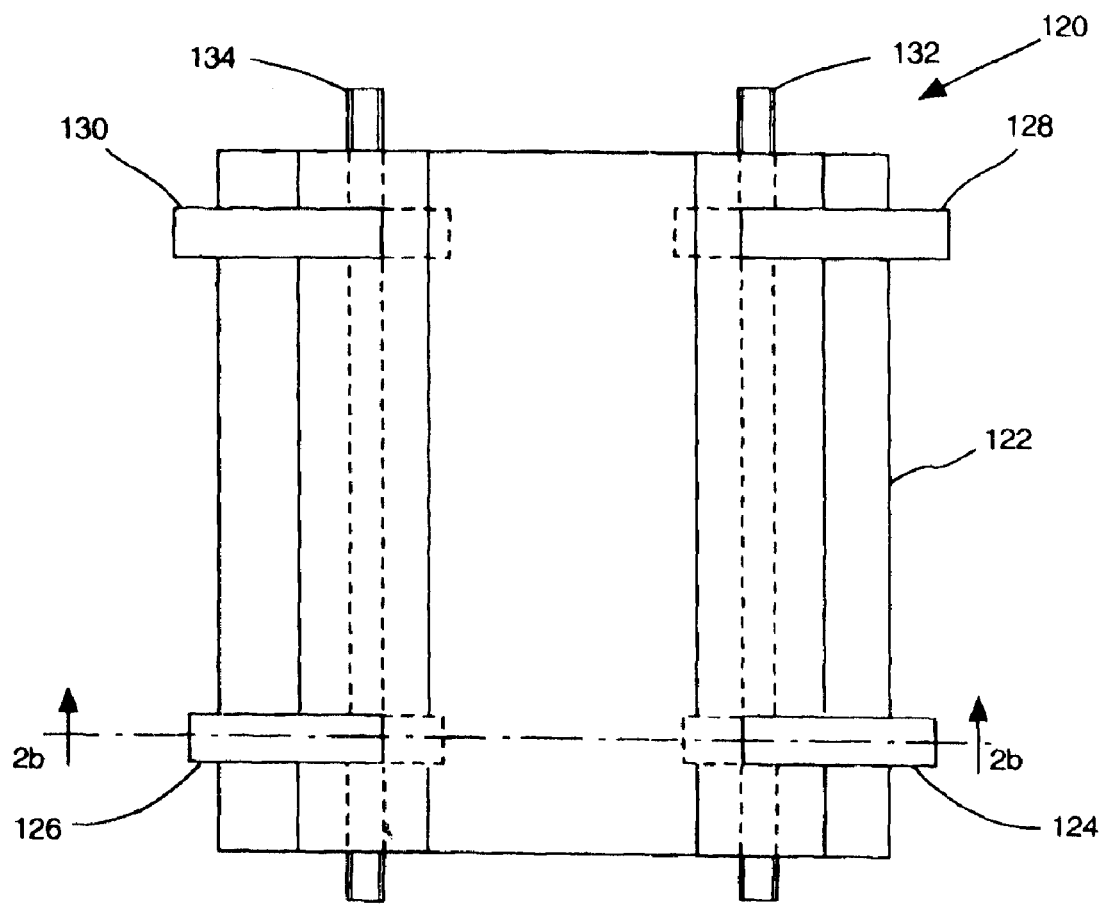
FIG. 2a is a top view of a dual wire feed guide tube in which only one strip is roll formed and the other strip is flat.

An illustrative example of this guide tube design is provided in FIG. 2a and FIG. 2b which show that a similar cross-sectional area can be generated by varying the width and thickness of the flat strip. By way of example, a 1 inch wide strip which is 3/16 inch thick has a cross-sectional area of 0.1875 inches^2. The same cross sectional area can be achieved with a 2 inch wide strip which is 3/32 inch thick. Additionally, the same cross-sectional are can be obtained for a 3 inch wide strip having a 1/16 inch thick strip. Note, that in this approximation, the thin roll formed strip contribution to the cross-sectional area is assumed to be negligible. The benefit of this design is that by maintaining the same cross-sectional area the load drawn by each of guide tube is more easily controlled as described above.

FIG. 2a is a front view of a dual wire feed guide tube in which only one strip is roll-formed and the other strip is flat. In this embodiment, the guide tube 120 comprises a flat strip 122 with insulator modules 124, 126, 128 and 130 which also are referred to as insulator buttons. The insulator modules are positioned at incremental stages. A thin strip 136 is roll formed to receive welding wire 132 and 134. Insulator modules 138 and 140 also are coupled to the thin strip 136. Persons with ordinary skill in the art will appreciate that the thin strip is coupled to the flat strip using well known techniques. The insulator modules are approximately ¼ inch thick but also can be made thinner. The insulator modules prevent arcing between the guide tube electrode and the substrates or the welding shoes.

FIG. 2b is a cross-sectional view of FIG. 2a. The thin strip 136 is roll formed into two triangular wedges which receive the welding wires 132 and 134. The insulating modules 138 and 140 are attached to the back of thin strip 136 at the triangular wedge position. By way of example and not of limitation the a guide tube shown in FIG. 2a and FIG. 2b is made of one flat strip having a variable thickness from $1/16^{TH}$ to $1/4^{TH}$ of an inch and the thin roll formed strip has a thickness ranging from 22 to 28 AWG.

Figure 3A:
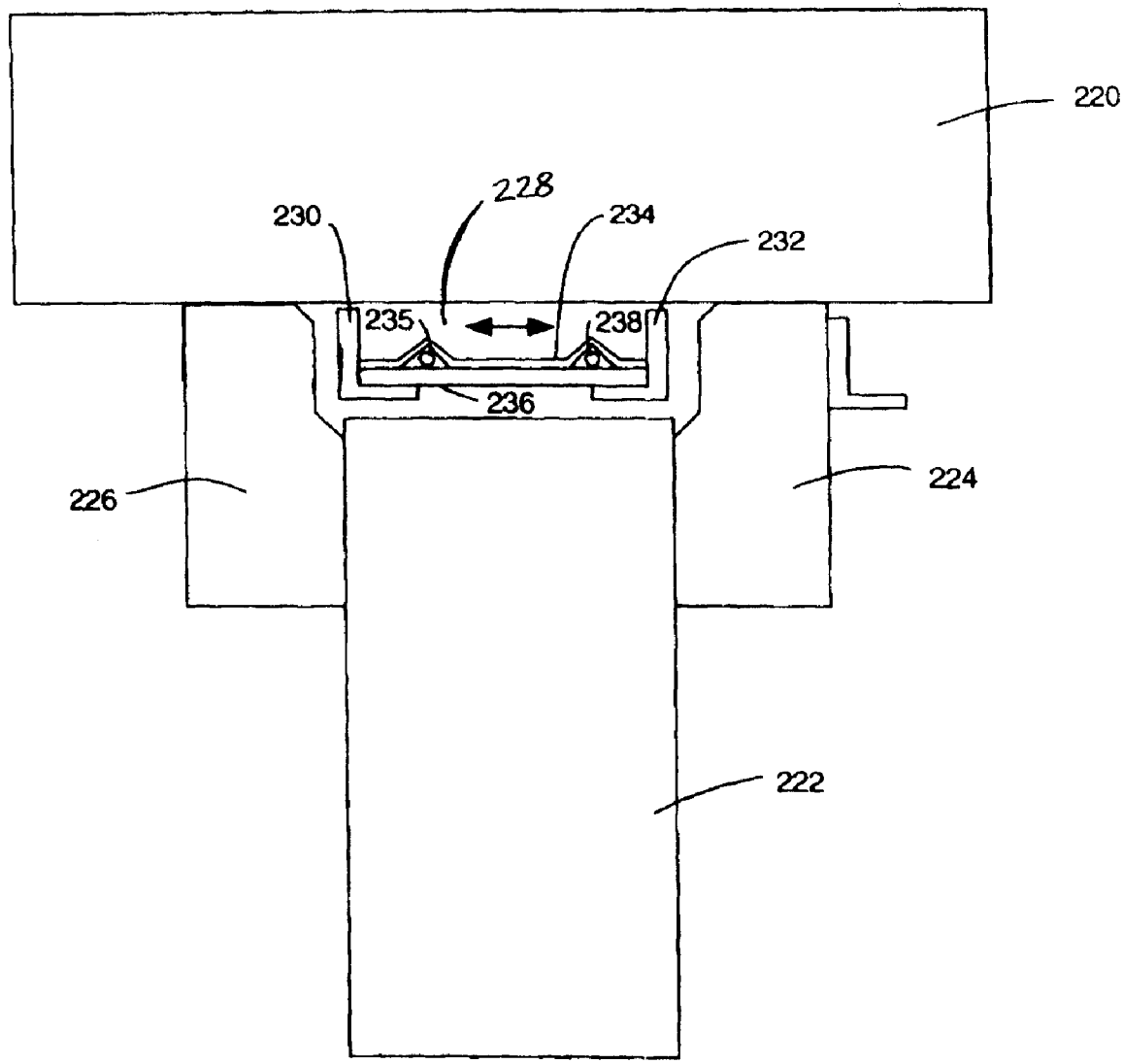
FIG. 3a is a guide tube within a weld cavity with insulators.

FIG. 3a is shows a guide tube within a weld cavity. A welding gap is created by placing two substrates or workpieces 220 and 222 next to one another. Two welding shoes 224 and 226 are placed adjacent the welding gap to define a welding cavity. The guide tube 228 is placed within the welding cavity. During operation the guide tube 228 can be oscillated. Insulator modules 230 and 232 are disposed on the edges of the guide tube to prevent short circuiting with the substrates 220 and 222 and the welding shoes 224 and 226.

The strips 234 and 236 of the consumable guide tube 228 comprise a low carbon steel, such as a 1008 carbon steel. High carbon steels are not desirable because they harden the weld and makes it less ductile.

In operation, the guide tube 228 feeds at least two welding wires 236 and 238 into the molten slag bath. The guide tube 228 and welding wires 235 and 238 act as an electrode which transmits the necessary power or amperage to maintain a molten slag bath. The welding wires 235 and 238 perform the function of feeding more mass into the weld puddle; this additional mass acts as a heat sink for the molten weld puddle and maintains a relatively shallow weld puddle.

A variety of benefits are associated with this shallow weld metal puddle. The benefits include providing a higher form factor, which is more crack resistant than electroslag welds made with processes and procedures requiring deeper molten metal weld pools. The deeper the molten weld metal puddle (not the molten flux puddle) the lower the form factor, and the more crack prone the weld becomes. The shallower the molten weld metal puddle, the higher the form factor, and the more crack resistant the weld becomes. The weld puddle can be kept shallow by using a metal-cored wire instead of a solid wire. The thin metal sheath of a cored wire tends to create a shallower metal puddle. Additionally, the weld puddle can be kept shallow by increasing the number of wires used to make the weld (at any given current) will make the weld metal puddle shallower. By way of example and not of limitaition, 2 wires at 1000-amps create a shallower puddle than 1 wire at 1000-amps. 4-wires at 1000-amps create a shallower puddle than 2 wires at 1000-amps, and so on. Furthermore, the weld puddle can be kept shallow by using an oscillating guide tube to spread the weld puddle, instead of using higher voltages to spread the weld puddle, creates a shallower puddle. Further still, the welding puddle can be kept shallow by using a smaller gap so that the weld cavity fills faster, thereby creating a shallower puddle. Since the vertical-rate-of-rise is faster, more base metal has be heated faster—taking heat away from the weld puddle, and making it shallower. Finally, the welding puddle can be kept shallow by using smaller diameter wires (1/16" dia instead of ⅛" or 3/32"). At any given current, a smaller diameter wire will yield a shallower puddle than a larger diameter wire. For instance, a weld made with a 1/16" dia wire, at 1000-amps, will produce a shallower puddle than a 3/32" dia wire at 1000-amps. A 3/32" dia wire will produce a shallower puddle than a 1/8" dia wire, and so on.

The benefits of having a shallower weld puddle are closely associated to the reduction of the heat affected zone. In the case of electroslag welding, a large heat input and a relatively slow travel speed generates a relatively deep weld puddle which in turn creates a very large heat affected zone. This large heat affected zone generally has a very low charpy impact value and provides the weakest portion of the electroslag weld. The weld metal impact values can be held high by adding alloying materials such as nickel, to increase the impact values in the resultant weld metal, but these alloy additions do nothing to increase the impact values metal in the heat affected zone. In order to minimize the heat affected zone it is preferable that the guide tube design include a multiple wire system to provide shallower weld puddles. It is also preferable to design narrow guide tubes configured to "guide" multiple wire systems. Preferably insulators which allow for guide tube oscillation also help reduce the size of the heat affected zone. Furthermore, a guide tube can be made to operate in a weld gap smaller than the 3/4" NGI-ESW weld gap.

It shall be appreciated by those skilled in the art having the benefit of this disclosure that a thin guide tube can be manufactured by making the insulator buttons "shorter", i.e. making the insulator buttons smaller than 1/4", e.g. 3/16". Additionally, the use of thinner strips for the guide tube can also be used to make the guide tube thinner. The thin guide tube is used in welding gaps which are smaller than the 3/4" weld gap used in the NGI-ESW method described above.

In operation, flux deposition must be regulated carefully. Recall that flux is converted to a molten slag, and the molten slag bath acts as a floating molten resistor which is heated by resisting the flow of current—just like the nichrome wire in a toaster is heated by resisting the flow of current. If the slag bath becomes too deep the molten slag bath dissipates heat over a larger surface of the substrate. This larger surface cools the molten flux bath and the flux puddle becomes colder. If the slag bath temperature becomes too low, the molten slag will not melt the wire as efficiently. This can cause incomplete penetration of the weld metal to the substrate, resulting in a defective weld. If the molten flux puddle becomes too shallow, the puddle is not required to heat as much surface area of the substrate, which causes the puddle to become very hot. This rise in flux puddle temperature can cause the guide tube to burn off above the flux puddle, inducing arcing between the electrode and the substrate or the weld puddle. As shown in FIG. 3, when the insulator modules 230 and 232 are melted, they contribute very little volume to the molten flux puddle. Insulator modules 230 and 232 are spaced at intervals, which contribute to the molten slag bath at a rate which is less than the rate at which the molten slag is lost from plating against the copper shoes 224 and 226. If the molten in the weld cavity becomes too low, an operator can hear the slag bath "popping" and simply can add additional flux manually. If automatic flux dispensing is used, the electronic control senses the current and voltages swings generated by a shallow puddle. The controller automatically adds flux to the puddle until the current and voltage swings are reduced to an acceptable level. This method will maintain the flux at a relatively constant level.

However, in certain welds such as box column or keyhole welds, there are no copper shoes and hence no loss of molten slag. In such instances, small "buttons" of insulators are used. These small buttons add minimal amounts of flux to the molten slag bath and thereby permit tall welds without appreciably increasing the depth of the flux. This corrects the problem generated by methods which coat the entire guide tube. When the entire guide tube is coated, it generates a molten slag bath which is too deep, thereby causing incomplete fusion in a box column or keyhole weld. Therefore, in a box column or keyhole weld, it would not be possible to use a guide tube with flux enveloped around the guide tube. The flux in the guide tube would cause the molten flux puddle to become deeper and deeper as the flux melted from the guide tube when the flux level became too deep. The weld cavity would experience such as incomplete fusion and flux inclusion.

Adding at least two wire feeds in the present process decreases dilution of the parent material and does not dilute the nickel concentration. In the Arcmatic™ process, at least two wires are used to weld the material. Even for one-inch strip, the novel Electroslag process uses two wires. The reason is for any given amperage you are feeding more mass into the strip by doubling the amount of mass of welding wires. This additional mass acts as a heat sink, which effectively "dries" up the molten weld puddle and maintains a shallow puddle depth. The shallower puddle depth maintains a higher form factor, which is more crack-resistant. The benefit of using more feed wires ius that it keeps the puddle shallow and more crack-resistant.

Figure 3B:
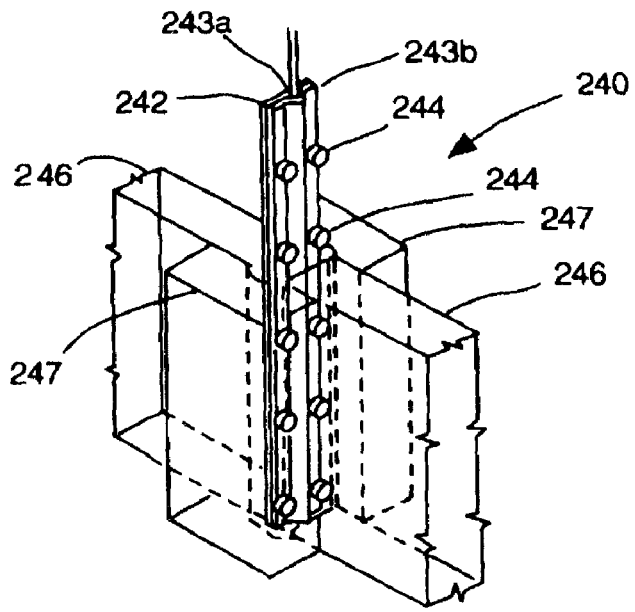
FIG. 3b is an isometric view of a single wire consumable guide tube.

FIG. 3b is an isometric view of a butt weld fixture for Electroslag welding 240 having a single wire consumable guide tube 242 disposed within a gap defined by two substrates and two copper shoes. More particularly, the single wire guide tube 242 is made from two separate strips of low-carbon hot rolled steel. The first steel strip 243a is flat, and the second steel strip 243b has one longitudinal channel rolled into the surface of the strip. The first steel strip 243a is placed on the second steel strip 243b and the one longitudinal channel provides a 1/8 inch diameter cavity which receives a 3/32 inch diameter welding wire. The strips 243a and 243b are spot welded to make the single wire consumable guide tube 242.

A plurality of insulator modules 244 are attached to either side of the guide tube 242 which interfaces with either the substrates 246 or with the copper shoes 247. It shall be appreciated by those skilled in the art having the benefit of this disclosure that copper shoes are used as retaining walls for the welding puddle and that copper shoes are generally hollow and water cooled. Therefore, copper shoes for purposes of this patent application is used generally to refer to a device which surrounds the weld puddle during a weld having two substrates which are being welded together. Preferably, these button insulators are disposed on the edge of the guide tube 242 to prevent arcing with either the substrates 246 or the copper shoes 247. It shall be appreciated by those of ordinary skill in the art that these button insulators are glued on to the surface with a glue or binding agent. The button insulators are made from the same flux material used during the electroslag welding process. Preferably, the button insulators are beveled and the large diameter portion of the insulator button is attached to the guide tube at intervals of 4 to 6 inches. When the molten flux puddle reaches the glued on button insulator, the insulator melts and becomes part of the molten flux puddle. The buttons are small enough that they cause no significant change to the resistance, chemistry, or depth of the weld puddle.

By way of example, the two hot rolled strips are 1/16" thick and when welded together provide a guide tube which is 1/8" thick. The button insulators are approximately 1/4" thick and when attached to the guide tube the guide tube width is 5/8".

The ⅝" guide tube may then be employed inside a ¾" narrow gap weld process as described above with a ⅛" of clearance. This clearance allows the guide tube to be oscillated. If the weld process requires the guide tube to be fixed, rolled alumina strips are wedded on either side of the guide tube to eliminate the ⅛" clearance.

It shall be appreciated by those skilled in the art that guide tubes may be manufactured with one or more longitudinal channels, and that guide tubes may be manufactured for operation at various widths.

Figure 3C:
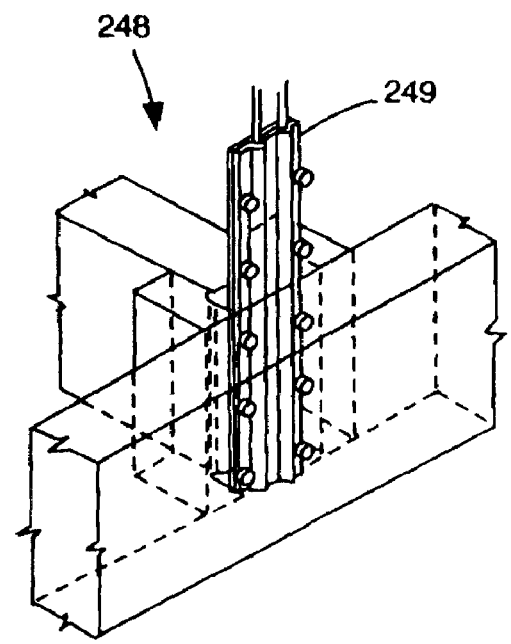
FIG. 3c is an isometric view of a dual wire consumable guide tube.

FIG. 3c is an isometric view of a butt weld fixture for electroslag welding 248 having a dual wire consumable guide tube 249 disposed within a gap defined by two substrates and two copper shoes. The dual wire consumable guide tube 249 is similar to the guide tube described in FIG. 3b, except the dual wire consumable guide tube 249 receives two welding wires.

Figure 4:
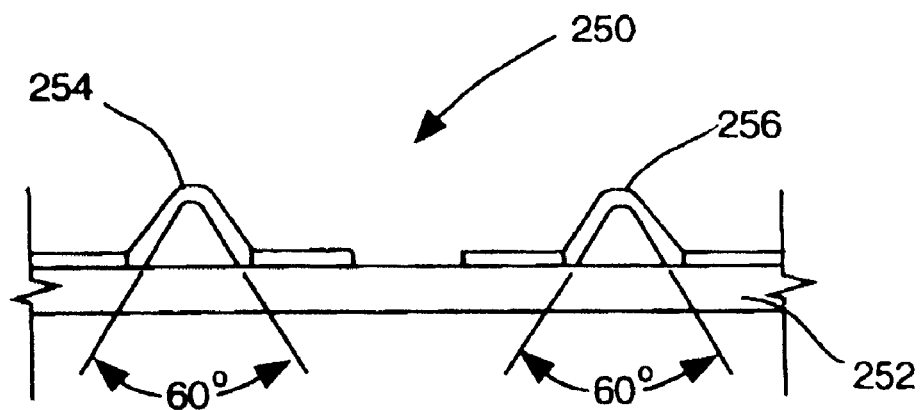
FIG. 4 is a side view of an embodiment in which three strips are joined such that one strip is flat and the other two strips are roll formed.

FIG. 4 is a side view of an alternative guide tube in which one strip is flat and the other two strips are roll formed. The guide tube 250 comprises a flat strip 252 joined or coupled to roll formed strips 254 and 256. By way of example and not of limitation, the roll formed strips or sheets are 20 to 28 gauge cold roll steel which are bent to a 60° angle. The insulating modules are not shown.

Figure 5:
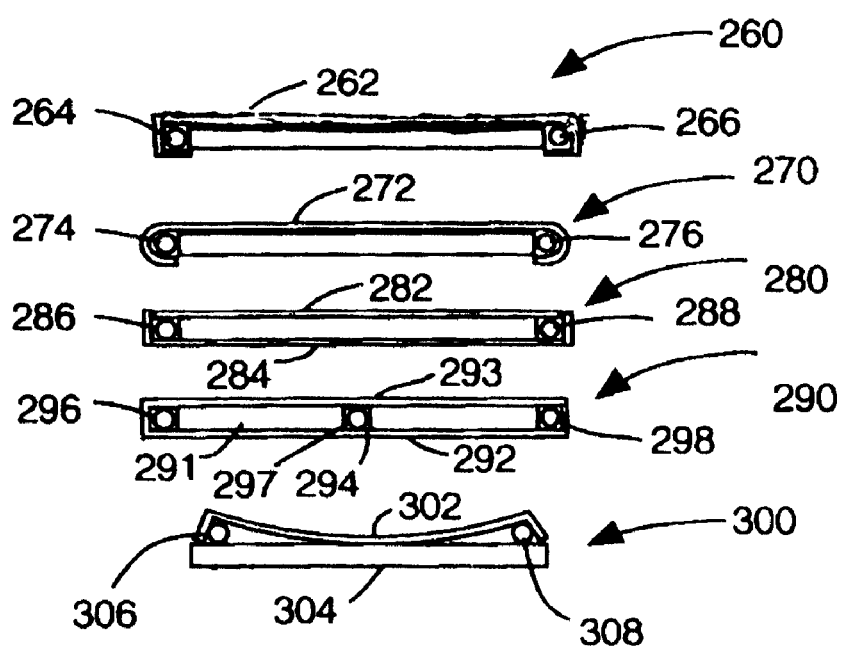
FIG. 5 is alternative embodiments of guide tube designs.

FIG. 5 is alternative embodiments of guide tube designs with flat strips and formed thin strips. Guide tube 260 comprises a thin strip that is formed to define two 90 degree elbows at the edges of the thin strip; the elbow provide an opening for welding wires 264 and 266. Guide tube 270 comprises a thin strip 272 that is formed with rounded edges; the rounded edges provide an opening for welding wires 274 and 276. Guide tube 280 comprises two thin strips 282 and 284 which are formed with one 90 degree elbow at the edges of each thin strip and providing an opening for welding wires 286 and 288. Guide tube 290 comprises two flat strips 291 and 292 joined to two thin strips 293 and 294 and providing an opening for welding wires 296, 297 and 298. Guide tube 300 comprises a thin strip 302 which has one 90 degree elbow at each edge and has a depression in the center of the thin strip 302 that is adjacent the flat strip 304; the depression and elbows provide an opening for welding wires 306 and 308.

The present guide tube comprises two low carbon steel strips having longitudinal channels, which receive two or more welding wires and have insulator modules, which do not increase the depth of the weld puddle.

Figure 6B:
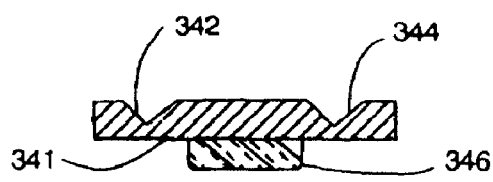
Figure 6D:
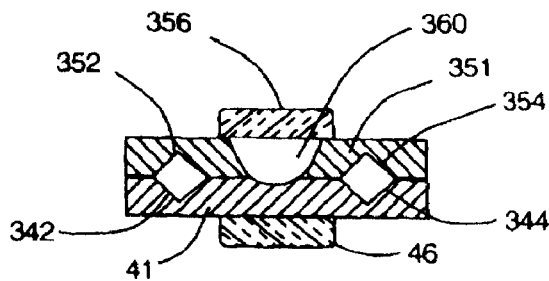
FIG. 6d is a cross-sectional view of FIG. 2c.
Figure 6A:
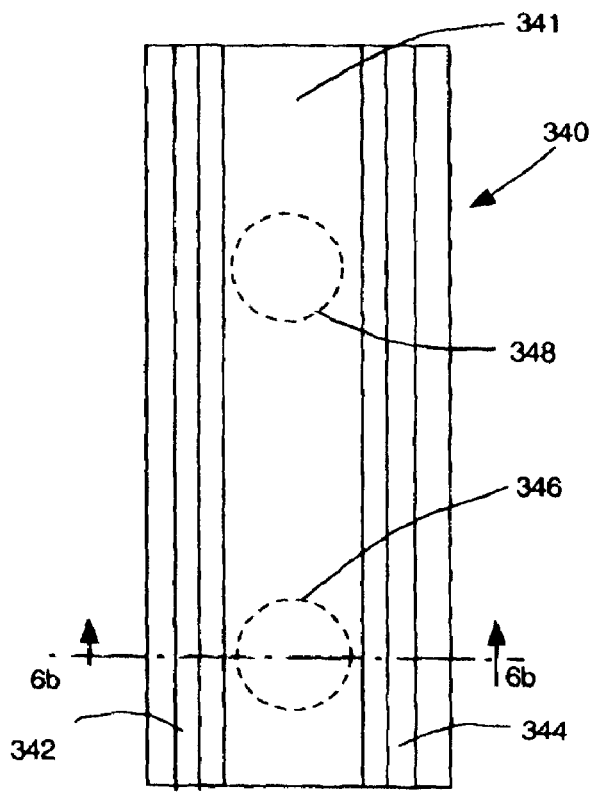
FIG. 6a is a top view of a single strip milled to receive two wire feeds with staged insulator modules.

FIG. 6a through FIG. 6d is an alternative embodiment of the guide tube in which both plates are shaped similarly. FIG. 6a is a top view of a guide tube 340 having a single strip milled or roll-formed to receive two wire feeds with staged insulator modules. FIG. 6a is the front face of a first elongated strip 341. The first elongated strip 341 has two longitudinal grooves 342 and 344 that are either milled or roll-formed into the strip 341 by methods well known in the art of machining or roll-forming. By way of example and not of limitation, the strip 341 is ⅛ of an inch thick and is 2 inches wide, and the longitudinal grooves 344 are approximately ⅝ of an inch from one another. In its preferred embodiment, the guide tube strip 41 is made of low carbon steel, such as a 1008 carbon steel.

Insulator modules 346 and 348 are disposed at incremental stages on the back face of strip 341. By way of example and riot of limitation, insulator modules 346 and 348 are disposed at intervals of four to six inches from one another. The selection of the intervals for the insulator modules is described more thoroughly below. The insulator modules 346 shown in FIG. 6a comprise high temperature glue mixed with a welding flux, and the insulator nodules are attached to strip 41 with the high temperature glue. By way of example and not of limitation, the welding flux is the same flux used to create the molten electroslag flux bath and the welding glue is a high temperature glue.

FIG. 6b is a cross-sectional view of FIG. 6a. The longitudinal channels 344 of first strip 341 are spaced evenly apart on the front face of first strip 341. By way of example and not of limitation, the insulator module 346 has a diameter of approximately 0.5 inches. Since the electroslag process which is hereby incorporated by reference allows the guide tube to be oscillated during the welding operation, the thickness of the insulators may vary to allow enough clearance in the weld gap for the guide tube to oscillate.

Figure 6C:
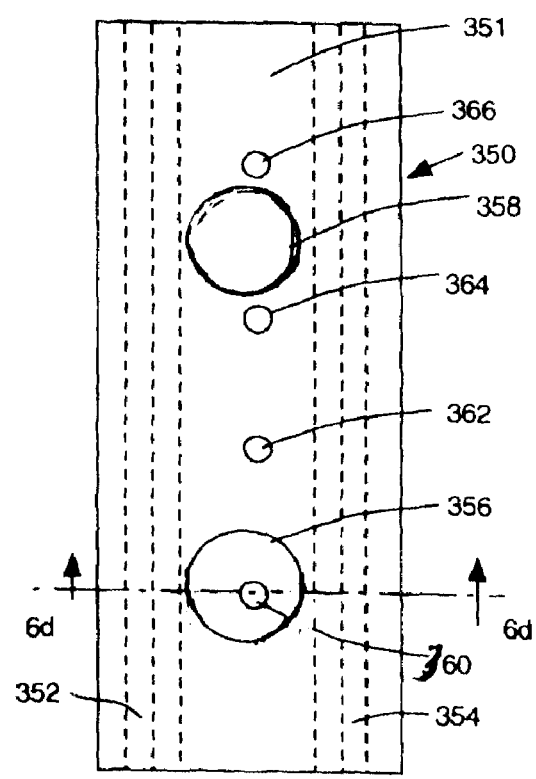
FIG. 6c is a top view of two single strips which are joined together.

FIG. 6c is a front view of two single strips which are joined or sandwiched together. The front view of apparatus 350 is of the back face of a second strip 351 having milled longitudinal channels 352 and 354 on the front face and two insulator modules 354 and 356 on the back face. The second strip is joined to the first strip by resistance spot welding at locations 360, 362, 364 and 366. Those skilled in the art that other techniques for joining the first strip to the second strip include tack welding the sides of both strips, or using an adhesive to join both strips, shall appreciate it FIG. 6d is a cross-sectional view of FIG. 6c. The cross sectional view is located at the location 360 where both strips have been resistance spot welded together. Note that the first strip 341 and second strip 351 are mirror images of one another and receive two welding wires bounded by channels 342 and 352 and by channels 344 and 354. It shall be appreciated that the guide tube described in FIG. 6a through 6d may receive more than two welding wires. Additionally, the guide tube described in FIG. 6a through 6d can be made of various widths, lengths and thicknesses.

Figure 7A:
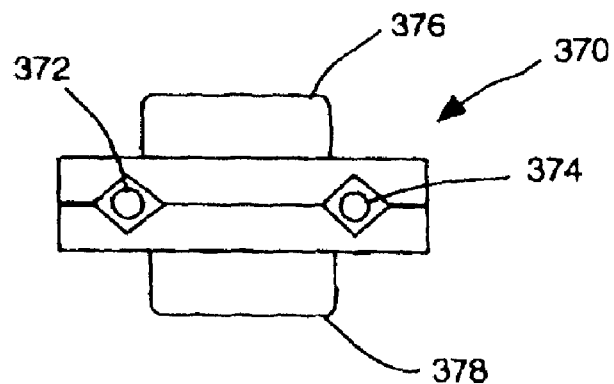
FIG. 7a is a side view of a guide tube having insulator modules on the back side of the joined strips

FIG. 7a is a cross-sectional view of a guide tube having insulator modules on the front side and back side of the joined strips. The guide tube 370 has milled or roll-formed longitudinal channels which receive wires 372 and 374. The insulator modules 376 and 378 are attached to the guide tube as described above. The two strips may be joined together by any method which is appreciated by those skilled in the art of joining metal strips.

Figure 7B:
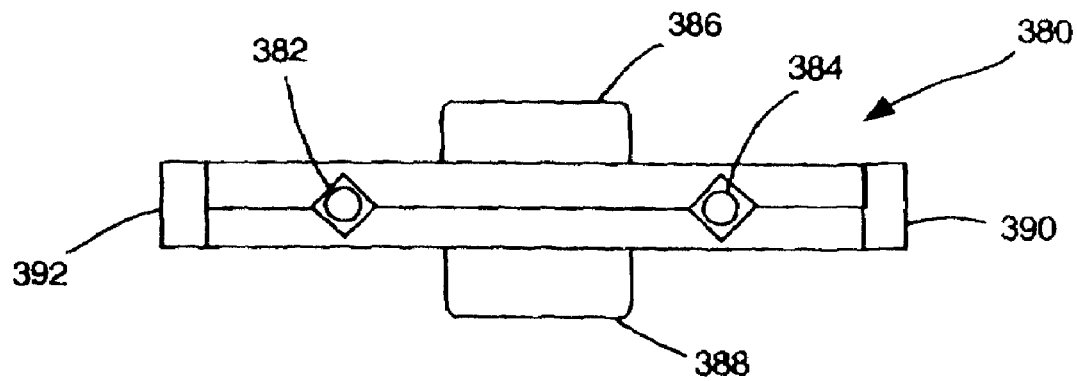
FIG. 7b is a side view of a guide tube having insulator modules on the back side of the joined strips and on the end of the wings of the guide tube.

FIG. 7b a cross-sectional view of a guide tube having insulator modules on the front, back and the two sides of the joined strips. The guide tube 380 has milled or roll-formed longitudinal channels which receive wires 382 and 384. The insulator modules include modules 386 and 388 which are attached to the front and back face of each strip; and insulator modules 390 and 392 which are attached to the side of the guide tube.

Figure 7C:
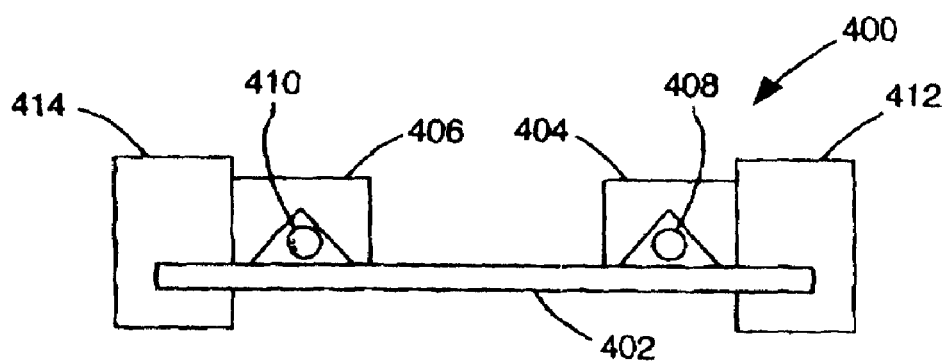
FIG. 7c is a side of an alternative embodiment in which three strips are joined together.

FIG. 7c is a cross-sectional view of an alternative embodiment in which three strips are joined together. Guide tube 400 comprises three strips. The first strip 402 is a flat metal strip. The second strip 404 and third strip 406 each have longitudinal channels. The second strip 404 and third strip 406 are coupled to the first strip 402. The second strip 404 coupled to the first strip 402 defines an opening through which wire 408 is received. The third strip 406 is coupled to the first strip 402 through which wire 410 is received. Insulator modules 412 and 414 are positioned on the edges or sides of the guide tube.

Figure 8:
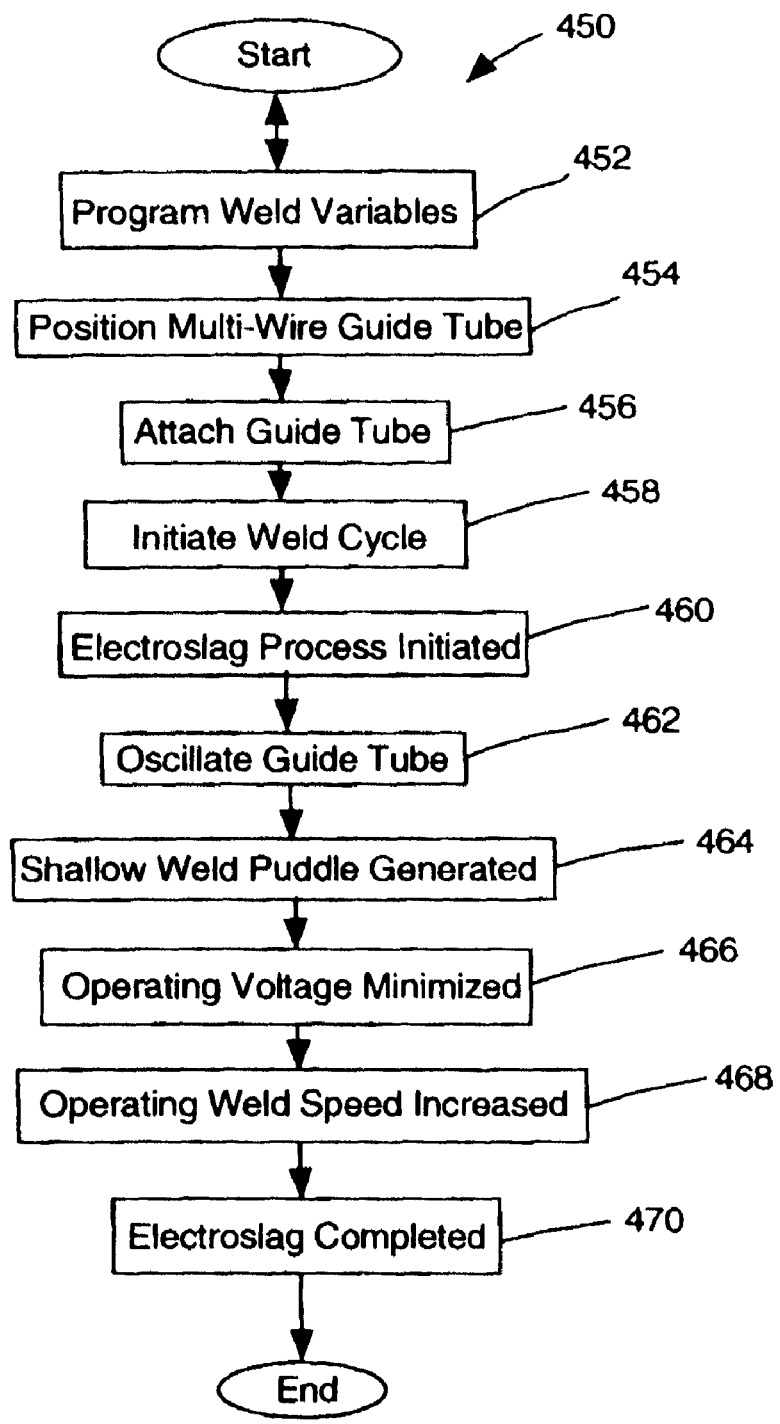
FIG. 8 is a method for using the guide tube in an electroslag process.

FIG. 8 is a method 450 for using the guide tube in an electroslag process. The guide tube operates in conjunction with an electroslag welding system which has been previously described and is incorporated by reference. The method is initiated at block 452 where the program welding variables are input in a computer. The method then proceeds to block 454 in which the guide tube is positioned into the welding cavity. After the guide tube is positioned in the weld cavity the method proceeds to block 456 where the guide tube is attached to a welding torch and wire feed conduits. As described by block 458, the weld cycle is then initiated and proceeds to block 460.

At block 460, after the weld cycle is initiated the electroslag process is initiated when a welding arc is struck in the sump. Weld flux is added to the welding arc until the flux is molten and forms a slag which rises to the bottom of the guide tube and extinguishes the arc. Once the electroslag process is underway, the insulators on the guide tube allow the guide tube to be oscillated to spread the weld metal to the full width of the substrate as shown in block 462. Preferably, multiple wires are also used to generate a shallows weld puddle to produce a higher form factor and make the weld more crack resistant. At block 464, a shallow weld puddle is generated by the methods described above which are not limited solely to the feeding of multiple wires into the weld puddle. At block 466, the operating voltage is minimized to reduce the size of the heat affected zone. At block 468, once the electroslag welding process is underway the operating weld speed may be increased because the substrate metal is has been heated. At block 470, the electroslag weld is completed and the welding cycle is completed, the wire feed is terminated, and the sump is removed and the run off tabs are removed from the top of the weld.

Figure 9:
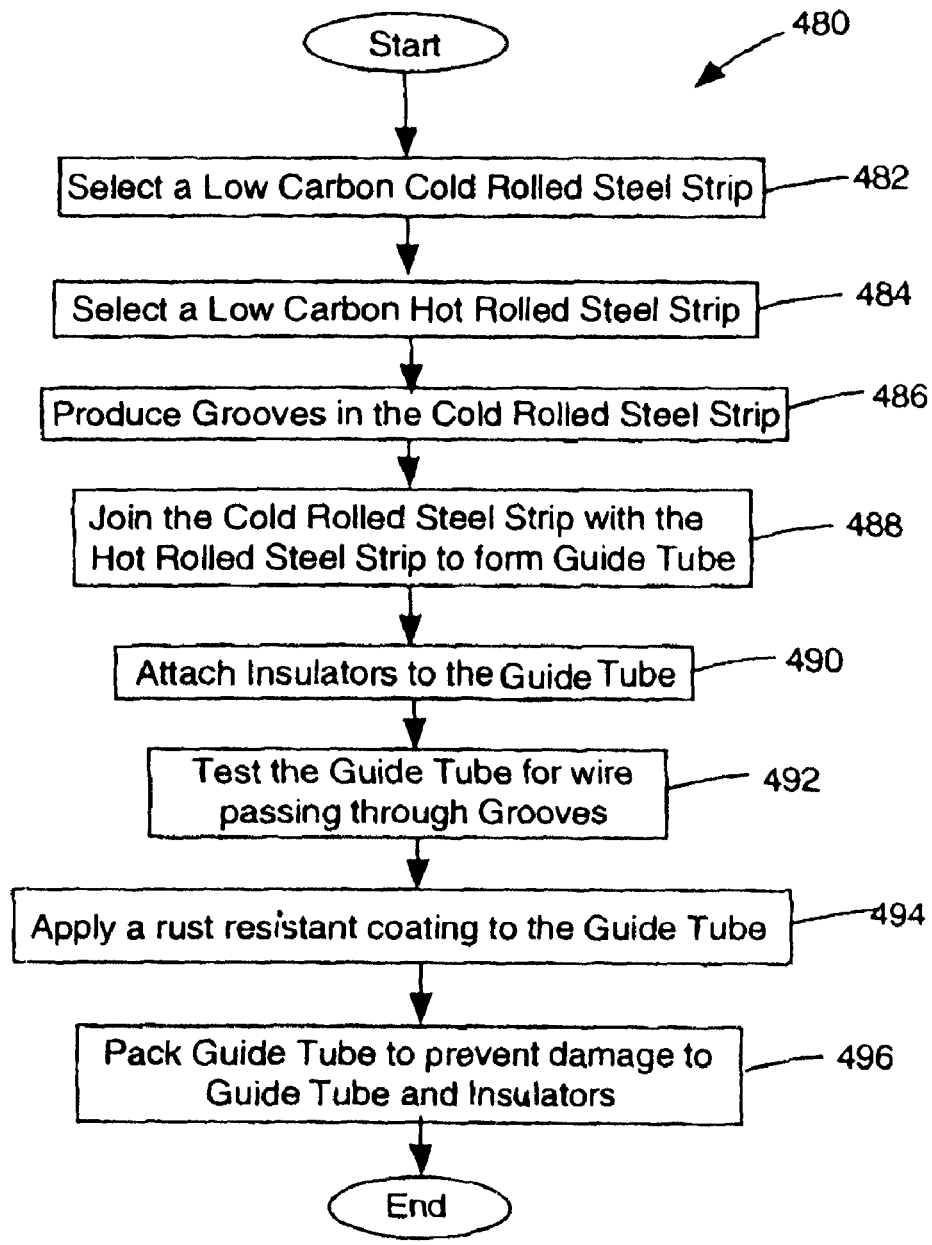
FIG. 9 is a method for manufacturing the guide tube.

FIG. 9 is a method 480 for manufacturing the guide tube. The preferable method for manufacturing the guide tube is engaged at block 482 in which a first metal strip is selected. The first metal strip is preferably a low carbon cold-rolled steel strip. At block 484, the second strip material is selected, and the second strip is preferably a low carbon hot-rolled steel strip. Alternatively, the first metal strip and second metal strip can be made of a low carbon steel or medium carbon steel. Additionally, the first metal strip and second metal strip can be cold-rolled steel or hot-rolled steel. It shall be appreciated by those of ordinary skill in the art that other types of steel having similar properties may also be used. The low carbon hot-rolled steel strip is used as the current carrying side of the guide tube, and is, therefore, thicker than the first metal strip. Alternatively, the first metal strip and the second metal strip are the same thickness. The method then proceeds to block 486.

At block 486, the longitudinal channels or grooves are machined, roll-formed or stamped in the first metal strip. Alternatively, the longitudinal channels or grooves may be attached to the second metal strip. The method then proceeds to block 488.

At block 488, the first metal strip which is cold rolled and the second metal strip which is hot rolled is joined together to form the guide. It is preferable, that the guide tube be a multi-wire guide tube which oscillates during an electroslag weld. The method then proceeds to block 490.

At block 490, the insulators are attached to the guide tube. The insulators are glued or attached to the to the front and back face of the guide tube. Preferably, the insulators are disposed on the guide tube to prevent arcing of the electrode guide tube with the substrate metal and the copper shoes. The insulators may be strip insulators or button insulators. The method then proceeds to block 492.

At block 492, the guide tube is tested to make sure the guide tube channel is configured to receive the appropriately sized welding wire. A rust resistant coating is then applied to the guide, as shown in block 494. Finally, at block 496, the guide tube is packaged in shipping boxes to prevent damage to the guide tube and its insulators.

While embodiments and applications of this invention have been shown and described, would be apparent to those skilled in the art that many more modifications than mentioned above are possible without departing form the inventive concepts herein. The invention, therefore, is not to be restricted except in the spirit of the appended claims.

What is claimed is:

1. A consumable guide tube configured to be placed in a weld gap, the guide tube comprising in combination:
   a first elongated strip and a second elongated strip wherein each of the strips have a front face and a back face, a length, and two elongated edges;
   at least one longitudinal channel having a uniform cross-sectional geometry defined on the front face of the first elongated strip distant from the elongated edges, the longitudinal channel positioned and sized to receive at least one welding wire;
   the front face of the first elongated strip joined to the front face of the second elongated strip; and
   a plurality of insulator modules coupled to the back face of the first elongated strip and the back face of the second elongated strip.

2. The guide tube of claim 1, wherein the guide tube is oscillated in an Electroslag welding process.

3. The guide tube of claim 1, wherein the first elongated strip comprises two or more longitudinal channels, wherein each channel has a uniform cross-sectional geometry.

4. The guide tube of claim 1, wherein the first elongated strip is joined to the second elongated strip by welding the first elongated strip with the second elongated strip.

5. The guide tube of claim 1, wherein the at least one longitudinal channel uniform cross-sectional geometry is circular.

6. The guide tube of claim 1, wherein the at least one longitudinal channel uniform cross-sectional geometry is triangular.

7. The guide tube of claim 1, wherein the first elongated strip is thinner than the second elongated strip.

8. The guide tube of claim 7, wherein the insulator modules are coupled to the first elongated strip and the second elongated strip at intervals.

9. A consumable guide tube used in an Electroslag process, the consumable guide tube configured to guide at least one welding wire into a welding cavity and transmits amperage to the at least one welding wire, comprising:
   a first elongated strip and a second elongated strip where the first elongated strip and the second elongated strip each has a front face and a back face, a length, and two elongated edges;
   at least one longitudinal channel having a uniform cross-sectional geometry defined on the front face of the first elongated strip distant from the elongated edges, the longitudinal channel positioned and sized to receive at least one welding wire;
   the front face of the first elongated strip joined to the front face of the second elongated strip; and
   a plurality of insulator modules coupled to the first elongated strip and the second elongated strip.

10. The guide tube of claim 9, wherein the first elongated strip is thinner than the second elongated strip.

11. The guide tube of claim 10, having two or more channels defined on the first elongated strip.

12. The guide tube of claim 11, having a plurality of insulator modules disposed in intervals of 4 to 6 inches.

13. A consumable guide tube configured to be placed in a weld gap, the guide tube comprising in combination:
   a thin first elongated strip having a front face and a back face, a length, and two elongated edges, wherein the front face has at least one longitudinal channel having a uniform cross-sectional geometry defined on the front face of the first elongated strip distant from the elongated edges, the longitudinal channel positioned and sized to receive at least one welding wire;

a second elongated strip having a front face and a back face, a length, and two elongated edges, wherein the front face of the second elongated strip is configured to be coupled to the front face of the thin first elongated strip; and a plurality of insulator modules deposited on the back face of the thin first elongated strip and on the back face of the second elongated strip.

14. The guide tube of claim 13, wherein the thin first elongated strip is a low carbon cold-rolled steel strip.

15. The guide tube of claim 13, wherein the second elongated strip is a low carbon hot-rolled steel strip.

16. The guide tube of claim 13, wherein the thin first elongated strip comprises two or more longitudinal channels, wherein each channel has a uniform cross-sectional geometry.

17. The guide tube of claim 13, comprising a rust resistant coating deposited on the guide tube.

18. The guide tube of claim 13, wherein the plurality of insulator modules is composed of a flux material used as flux during an Electroslag process.

19. The guide tube of claim 13, wherein the thin first elongated strip is coupled to the second elongated strip.

20. The guide tube of claim 13, wherein the thickness of the combination of the thin first elongated strip, the second elongated strip, and plurality of insulator modules is less than 0.75 inches.

* * * * *